US011739734B2

(12) United States Patent
Neogi et al.

(10) Patent No.: US 11,739,734 B2
(45) Date of Patent: Aug. 29, 2023

(54) FATIGUE LOADS IN WIND TURBINES AND USE OF OPERATIONAL METADATA

(71) Applicant: General Electric Renovables Espana, S.L., Barcelona (ES)

(72) Inventors: Ganesh Neogi, Hamburg (DE); Arne Scheunemann, Hamburg (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/499,913

(22) Filed: Oct. 13, 2021

(65) Prior Publication Data
US 2022/0112884 A1 Apr. 14, 2022

(30) Foreign Application Priority Data
Oct. 14, 2020 (EP) .................................... 20201814

(51) Int. Cl.
*F03D 17/00* (2016.01)

(52) U.S. Cl.
CPC .......... *F03D 17/00* (2016.05); *F05B 2260/80* (2013.01)

(58) Field of Classification Search
CPC ....... F03D 17/00; F03D 7/0224; G08B 21/18; G01G 23/01; F05B 2260/80; F05B 2260/84; F05B 2270/331
See application file for complete search history.

(56) References Cited

U.S. PATENT DOCUMENTS

| 7,895,016 B2 | 2/2011 | Vittal et al. |
| 8,649,911 B2 | 2/2014 | Avagliano |
| 9,035,479 B1 | 5/2015 | Gates |

(Continued)

FOREIGN PATENT DOCUMENTS

| CN | 106 815 771 A | 6/2017 |
| EP | 2 3 20 077 A1 | 5/2011 |
| EP | 2 886 853 A1 | 6/2015 |

OTHER PUBLICATIONS

EP Search Report and Written Opinion, dated Apr. 6, 2021.
(Continued)

*Primary Examiner* — Sabbir Hasan
*Assistant Examiner* — Joshua R Beebe
(74) *Attorney, Agent, or Firm* — Dority & Manning, P.A.

(57) ABSTRACT

The present disclosure relates to methods and systems for determining fatigue loads in a wind turbine. Such a method may comprise obtaining operational metadata representative for an operational situation, and determining whether the operational metadata corresponds to operational metadata from one of a plurality of previously defined operational situations for which fatigue loads are known, the plurality of previously defined operational situations being stored in an operational situations database. If the operational metadata representative for the operational situation substantially corresponds to operational metadata from the stored previous operational situation, then the fatigue loads for the stored previously define operational situation are summed to historically accumulated fatigue loads to determine total accumulated fatigue loads. Methods for registering an operational situation in a wind turbine are also provided.

11 Claims, 5 Drawing Sheets

(56) References Cited

U.S. PATENT DOCUMENTS

| | | | |
|---|---|---|---|
| 2014/0178197 A1* | 6/2014 | Risager | F03D 7/0224 |
| | | | 416/31 |
| 2014/0288855 A1* | 9/2014 | Deshpande | F03D 7/0292 |
| | | | 702/34 |
| 2018/0142674 A1* | 5/2018 | Hammerum | F03D 7/045 |
| 2019/0018403 A1* | 1/2019 | Ueki | F03D 17/00 |
| 2019/0155235 A1* | 5/2019 | Qvist | H04L 67/12 |
| 2019/0178231 A1* | 6/2019 | Tomas | F03D 7/0292 |

OTHER PUBLICATIONS

Cosack, Fatigue Load Monitoring with Standard Wind Turbine Signals, XP055789465, Germany, Apr. 7, 2020, pp. 1-243. Retrieved from https://d-nb.info/1009926721/34

\* cited by examiner

FATIGUE LOADS IN WIND TURBINES AND USE OF OPERATIONAL METADATA

The present disclosure relates to wind turbines, and more particularly relates to methods and systems for registering and determining fatigue loads in wind turbines. The present disclosure further relates to the use and generation of operational metadata in a wind turbine.

BACKGROUND

Modern wind turbines are used for supplying electricity to the grid. A wind turbine generally includes a tower with a nacelle supported on top of the tower. A wind turbine rotor comprising a hub and a plurality of wind turbine blades may be rotatably mounted to the nacelle.

The wind turbine blades may be set in motion by wind. The hub of the wind turbine may be operatively coupled with a rotor of a generator. As the hub and blades rotate, the kinetic energy of the wind is converted to kinetic mechanical energy of the wind turbine rotor and ultimately to electrical energy or power in the generator. The generator may typically be arranged inside the nacelle.

The wind turbine rotor may be coupled directly to the generator rotor in so-called direct drive wind turbines. Or the wind turbine rotor may include a main rotor shaft (a so-called "low speed shaft" which leads to a gearbox. A high-speed shaft of the gearbox may then drive the generator. Regardless of the topology of the wind turbine, the electrical power output of the generator may be fed to an electric grid. The connection of the generator to the grid may include e.g. a converter, transformer, medium voltage line and other.

Wind turbines may be grouped together in so-called wind farms or wind parks which may have a common point of connection to the electrical grid. The connection point defines a power plant from the electrical distribution grid perspective.

A control system or "controller" may be provided for a wind turbine, which may be physically located in the wind turbine e.g. the nacelle or may be positioned remotely. Generally, a wind turbine control system may be partially incorporated in the wind turbine itself, and partially outside the wind turbine, namely at a wind farm level and/or remotely.

The control system of a wind turbine may include a so-called SCADA ("Supervisory Control And Data Acquisition") system. The SCADA is a control system architecture comprising computers, and data communications capability for high-level process supervisory management. The SCADA may include programmable logic controllers (PLC), which is a type of industrial digital computer.

Control through a SCADA system typically comprises different levels of control. Level 0 in such a system may include sensors (temperature sensors, flow sensors, position sensors etc.), and actuators. Level 1 may include industrialized input/output (I/O) modules, and their associated distributed electronic processors and level 1 may include one or more PLC's. Level 2 may be a supervisory computer which may be locally arranged in the wind turbine. Level 2 refers to the computer and software responsible for communicating with Remote Terminal Units (RTU's, which connect to sensors and actuators) and PLCs. The PLCs are connected to sensors and actuators in the process, and are networked to the supervisory system. Level 3 may be a wind farm controller and does not need to be comprised in or form part of an individual wind turbine, but is usually physically provided in the wind farm. Level 4 may be a remote control center that can be remote to a wind farm and can potently supervise and collect data from multiple farms.

The wind turbine controller may be configured to determine suitable actuator setpoints for the wind turbine based on the prevailing circumstances. The actuator setpoints for modern variable speed wind turbines include e.g. the generator torque and the pitch angle of the blades. Through control of the pitch angle(s) of the blade(s) and the generator torque, the speed of the rotor may be controlled, as well as the electrical power output, aerodynamic thrust and further mechanical loads. The purpose of the control system is generally to maximize electrical power output while at the same time keeping loads in the wind turbine at an acceptable level. Further actuators in wind turbines may be envisaged in this respect for controlling aerodynamic torque of the wind turbine rotor, the electromagnetic counter torque on the generator, and nacelle and tower motion. Such actuators may include, aerodynamic flaps, ailerons, spoilers, thrusters, deformable blade surfaces and many others.

Normal operation of a wind turbine may generally be along a predefined power curve, which prescribes the operation of the wind turbine as a function of the prevailing wind speed. Normal operation includes different operational ranges. In lower wind speed ranges, the objective is generally to maximize electrical power output. In higher wind speed ranges, particularly wind speeds above nominal wind speed, the operation of the wind turbine is focused on keeping loads under control, while maintaining electrical power output at a predetermined level.

As mentioned before, the actuator setpoints of torque and pitch (but also other actuators such as yaw) may be changed in accordance with circumstances. Such circumstances may include e.g. the average wind speed, turbulence, wind shear, air density and other meteorological conditions but also internal conditions like vibrations, mechanical loading or component temperatures etc. They may also include specific external demands to reduce noise, an interruption of operation for maintenance, a grid based situations of e.g. demand of reduction of active power, or a grid event such as a low voltage event, a zero voltage event, an increase in grid frequency or other.

The wind turbine controller may be programmed to, based on a set of measured variables received from a variety of sensors, send signals to various systems (such as e.g. the generator, the pitch system and a yaw system) to influence the operation of the wind turbine. The sensors may include rotor speed sensor, load sensors (strain gauges or accelerometers), anemometer, weathervane, and others.

In order to ensure that a wind turbine or its components do not fail prematurely, it is known to estimate loads that a wind turbine suffers throughout its lifetime, using a numerical model for loads estimation. For example, based on average wind speeds, and turbulence in short time windows, fatigue loads may be estimated. Such potential fatigue loads may be estimated prior to commissioning of a wind turbine based on wind speed measurements. Actual fatigue loads may also be registered during operation. Fatigue loads that occur during the life of a wind turbine may be determined, and if the fatigue limits of wind turbine components are known, then an estimation of the remaining lifetime of components can be made. Operational changes may be made or maintenance may be planned based on such estimations of remaining life time.

However, it has been found that grid situations, defined by grid requirements are not generally taken into account in the estimation of fatigue loads in wind turbines, whereas these grid situations actually can have an important effect on loads and the fatigue life of wind turbine (components). The loads caused by these circumstances are generally not considered extensively during certification calculations leading to increased uncertainty with respect to fatigue loads and lifetime estimation based on transients and prolonged operation in response to situations on the grid.

Grid events can lead to operational changes deviating from what may be considered normal operation of the wind turbine. The electrical power output may generally be reduced in these cases (or may be less than the operational optimum of the wind turbine at that time). Based on the relatively low power output during such transients, relatively low loads could be assumed, but the loads actually may remain high or even increase. The grid events may e.g. cause stall margins to reduce, oscillations to occur, auxiliary systems to be demanded and/or operation to be close to critical frequencies.

The present disclosure provides examples of systems and methods that at least partially resolve some of the aforementioned disadvantages.

Definitions

Throughout the present disclosure, the following definitions and explanations shall apply, unless indicated otherwise.

The operational lifetime of a wind turbine can be regarded as a large number of sequential slices or periods of time. The slices of time may have a variable length and during such a slice of time, the operation of the wind turbine may be constant (steady state) or relatively quickly changing (transient).

Each of these slices of time for which the operation of the wind turbine may be described with a given set of operational data is herein regarded as an operational situation. An operational situation can therefore relate to steady state operation or a transient situation. As will be explained hereinafter, each operational situation may be described by operational metadata which may be used for fatigue load determination using a numerical model for load estimation. Different operational situations may have different length of time.

Steady state operation may be regarded as normal operation of the wind turbine without significant change in operational metadata.

An operational event as used throughout the present disclosure may be regarded as a change in operational metadata and it indicates a shift between two operational situations. The operational event itself is an operational situation in the above explained sense as well.

A grid event is a specific example of an operational event. A grid event may be detected by setpoint change(s) as a reaction to electrical grid sensors (frequency, line voltage) or a reaction to a wind farm command (reactive power and/or active power setpoint). A wind farm controller may receive such setpoints centrally from the grid operator and distribute them to individual wind turbines, or individual turbine controllers can receive a setpoint from the grid operator directly.

Operational data of the wind turbine is the data available in the wind turbine controller, and can include all signals or settings of the systems under the control of or connected to the wind turbine controller. These systems include e.g. the generator (the signals or setting may include e.g. electrical power output, generator rotor speed) and the pitch systems (the signals or settings may include the pitch angle), and the operational data may particularly include signals internal to one or more PLC's of the wind turbine controller. In this sense, the controller itself is one of the sensors or sensor systems that describes the operational situation of the wind turbine. The computations carried out by the wind turbine controller and the signals and setpoints processed and set by the controller can therefore form part of the operational data that may be regarded as characteristic to describe a specific operational situation.

Operational metadata is derived from the operational data by processing and/or compressing the operational data based on statistical parameters. The operational metadata can thereby provide a description like a "fingerprint" of a particular operational situation. Each operational situation may have a different length of time i.e. operational data may stay substantially the same or may be considered representative for a 5, or 10 or 30 minutes period. In other occasions, much shorter time periods like 30 seconds or 1 minute time period may be used. The operational metadata may include particularly statistical metadata, e.g. average values, mean values, and standard deviations of operational data during the time period of the operational situation. Operational metadata may also include first or second (or further) time derivatives of the operational data, as well as data composed of different variables, i.e. a ratio between two variables such as active power output and a mechanical load, or the product of two variables such as pitch speed and pitch activation time.

SUMMARY

In a first aspect, a method for determining accumulated fatigue loads in a wind turbine is provided. The method comprises obtaining operational metadata representative for an operational situation, and determining whether the operational metadata corresponds to operational metadata of one of a plurality of previously defined operational situations for which fatigue loads are known, the plurality of previously defined operational situations being stored in an operational situations database. If the operational metadata representative for the operational situation substantially corresponds to operational metadata from one of the previously defined operational situations, then the fatigue loads for the previously defined operational situation for which the operational metadata corresponds are summed to historically accumulated fatigue loads to determine total accumulated fatigue loads.

In accordance with this aspect, a method for determining fatigue loads is provided which uses operational data that is available in a wind turbine control system to determine fatigue loads. The method does not require additional load sensors in order to provide a reliable estimate of fatigue loads in different operational situations including e.g. a grid situation. The method may therefore be used on standard wind turbines without the need for specific dedicated sensors.

It has been found that by relying on the operational metadata, reliable determinations of fatigue loads can be made. So even if meteorological or grid data may be different, if the operational metadata (including e.g. actuator setpoints) is the same as for a known, previously defined, operational situation, then the fatigue damage may be assumed to be the same as for the known operational situation.

The known loads for the known operational situations may have been previously determined from numerical simulation.

In a further aspect, a system for determining fatigue loads in a wind turbine is provided. The system comprises a local wind turbine module for determining operational metadata of the wind turbine representative for an operational situation, a load estimation module configured to determine fatigue loads of an operational situation characterized by the operational metadata of an operational situation, and a module for determining accumulated fatigue loads configured to determine accumulated damage equivalent loads for the wind turbine by summing damage equivalent loads for operational situations that have occurred during the lifetime of the wind turbine.

In this respect, the local wind turbine module may be or comprise software or a combination of hardware and software connected to the wind turbine controller.

In yet a further aspect, a method for registering an operational situation in a wind turbine is provided. The method comprises determining operational data including signals and/or setpoints of one or more wind turbine components under the control of a wind turbine controller, and determining a change in the operational data indicating an end of the operational situation. The method further comprises determining operational metadata of the wind turbine representative for the operational situation, wherein the operational metadata is derived from the operational data during the operational situation.

In this aspect, efficient communication and high frequency data transmission can be provided for the wind turbine controller. The operational data may be efficiently "packaged" and compressed by deriving the relevant operational metadata and only transmitting the metadata. Data storage needs per turbine may be reduced. The metadata may be used to capture the essentials of a particular operational situation.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
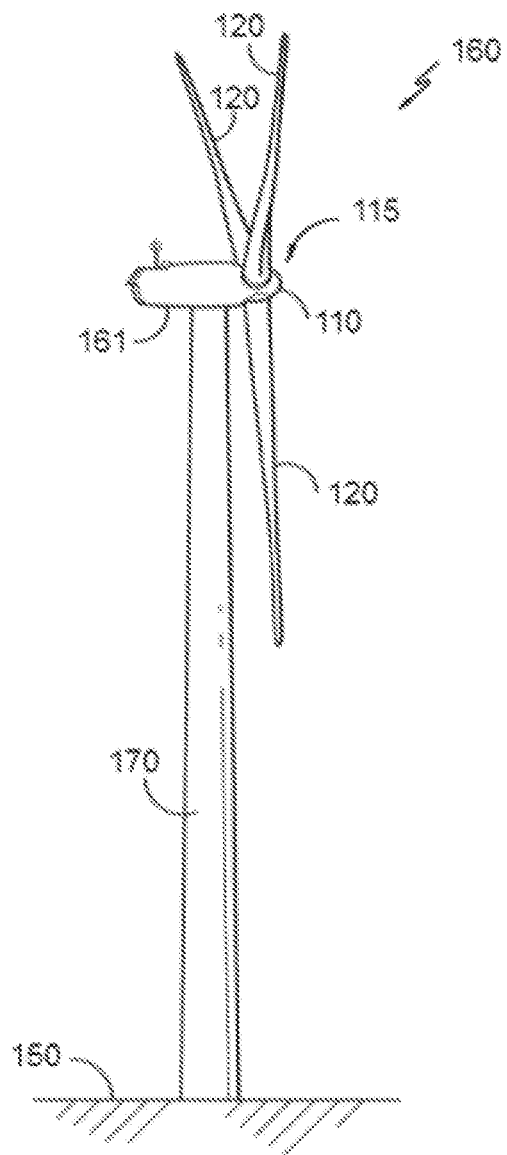
FIG. 1 illustrates a perspective view of a wind turbine according to one example.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
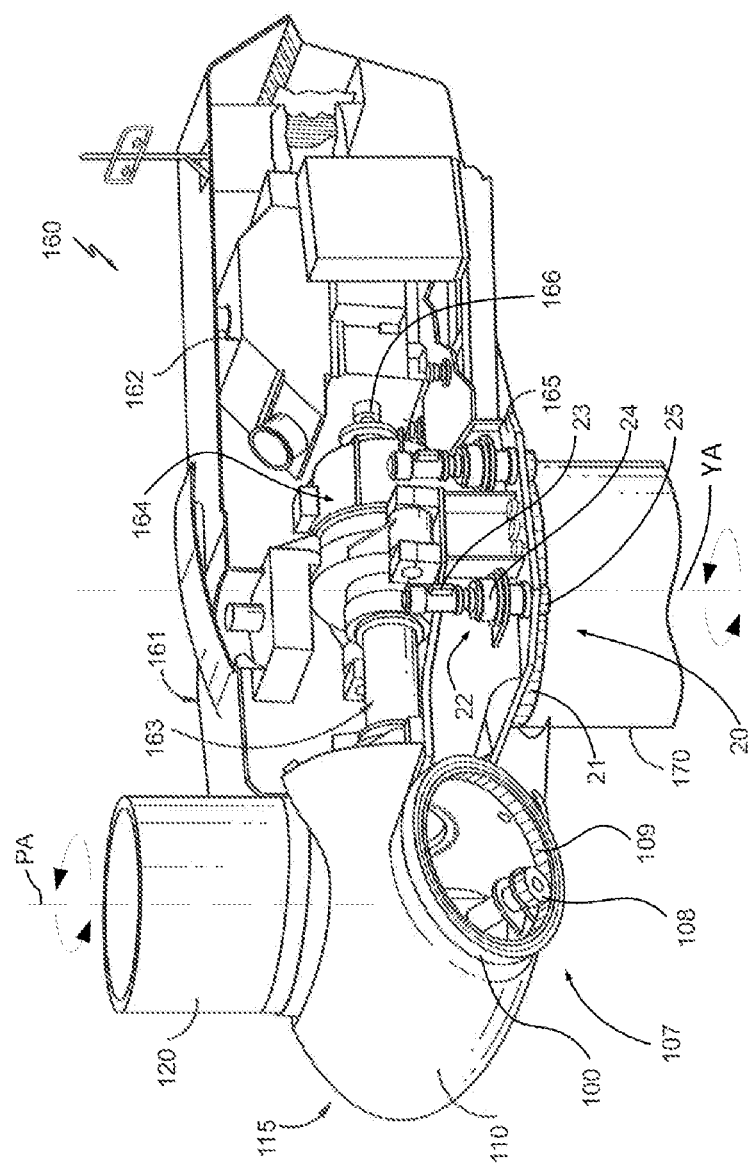
FIG. 2 illustrates a detailed, internal view of a nacelle of a wind turbine according to one example.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

The energy produced by the generator may be delivered to a converter which adapts the output electrical power of the generator to the requirements of the power grid. The electrical machine may comprise electrical phases, e.g. three electrical phases. The converter may be arranged inside the nacelle or inside the tower or externally.

Figure 3:
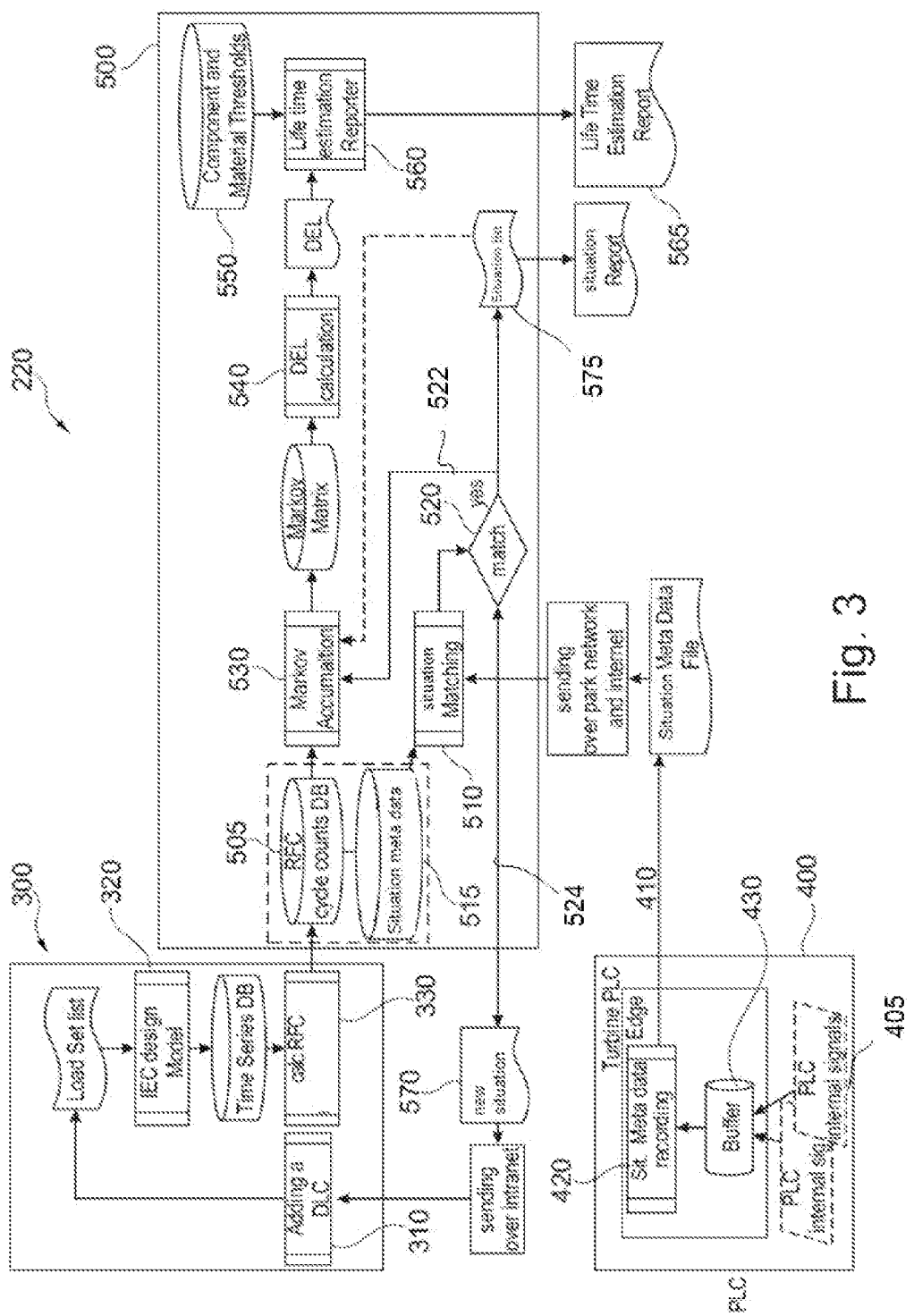
FIG. 3 schematically represents a schematically illustrates an example of a system for determining fatigue loads in a wind turbine in case of a grid situation.

FIG. 3 schematically illustrates an example of a system 220 for determining fatigue loads in a wind turbine.

A system 220 for determining fatigue loads in a wind turbine in accordance with FIG. 3 comprises a local wind turbine module 400 for determining operational metadata of the wind turbine representative for an operational situation, a load estimation module 300 configured to determine fatigue loads corresponding to an operational situation characterized by (i.e. described by) the operational metadata; and a module for determining accumulated fatigue loads 500 configured to determine accumulated damage equivalent loads for the wind turbine by summing damage equivalent loads for operational situations that have occurred during the lifetime of the wind turbine.

The local wind turbine module 400 may be provided locally, i.e. within the wind turbine (for example in the nacelle) or in direct vicinity of the wind turbine. The module 400 may have access to the internal signals of the controller.

In examples, the local wind turbine module 400 is configured to send operational metadata representative for the operational situation to the module 500 for determining accumulated fatigue loads.

The local wind turbine module 400 may herein comprise the direct control of the wind turbine operation i.e. the wind turbine controller represented by a network of PLC's sending signals 405, a buffer 430, and a separately linked PLC 420.

The buffer 430 may continuously obtain and store signals 405 from the direct control wind turbine controller. The PLC 420 may be configured to send the operational metadata to the module 500 for determining accumulated fatigue loads.

The PLC 420 may also be configured to determine the end of an operational situation and beginning of a new operational situation. The transition from one operational situation to a next is marked by a change in operational data, and operational metadata. Although the metadata recording at block 420 is herein depicted as a separate PLC, it should be clear that any combination of hardware, firmware and/or software may be used that is suitable for the functions herein described. In one example, block 420 may be on the same PLC as the wind turbine controller.

Figure 5:
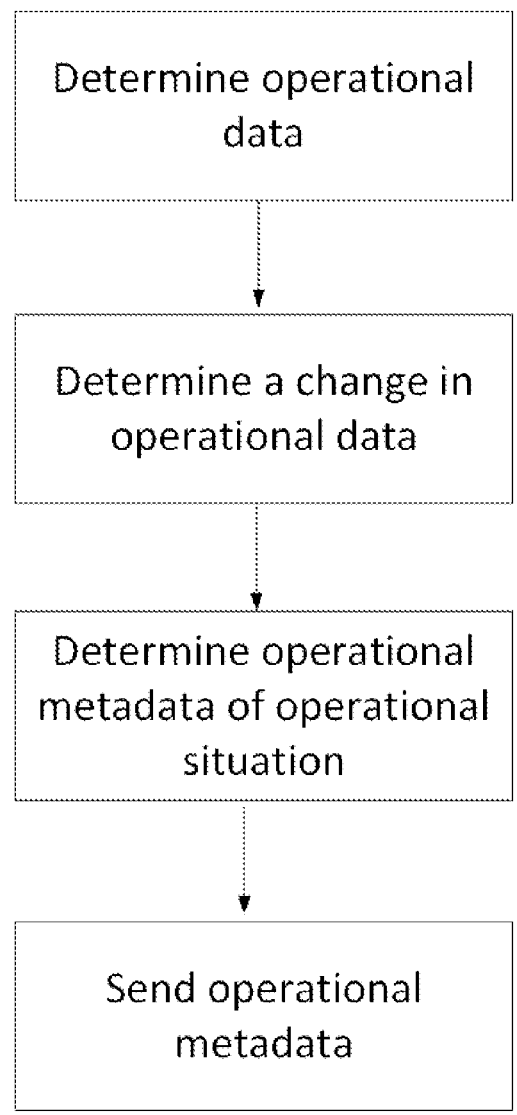
FIG. 5 schematically illustrates an examples of a method for registering an operational situation in a wind turbine.

In an aspect of the present disclosure, a method for registering an operational situation in a wind turbine is provided (an example of which is schematically illustrated in FIG. 5). The method comprises determining operational data including signals and/or setpoints of one or more wind turbine components under the control of a wind turbine controller; and determining a change in the operational data indicating an end of the operational situation. The method then further comprises determining operational metadata of the wind turbine representative for the operational situation, wherein the operational metadata is derived from the operational data during the operational situation.

A change as used herein may be regarded as an operational event, i.e. a significant change of the operational data going beyond the normal continuous variation belonging to the same operational situation.

The method may be carried out by the local wind turbine module 400. Throughout operation of the wind turbine, the controller may read, operational and internal signals from one or more PLC's. The operational signals may include e.g. actuator setpoints like generator settings (Speed, output), pitch system settings (e.g. pitch angles of different blades, power of pitch motors), yaw system settings (e.g. yaw angle, power output of one or more yaw motors) and sensor measurements including wind direction, temperature and other. Internal signals may include e.g. PID gains.

The operational and/or internal signals may be stored in buffer 430. When an end of an operational situation is detected (i.e. a new operational situation is starting), or an end of an operational situation is communicated, the signals corresponding to the behavior of the wind turbine during the operational situation may be sent to module 500. Such operational metadata may be regarded as a fingerprint of a specific operational situation.

In some examples, the operational metadata may include one or more of the following: average values, mean values, and standard deviations of the operational data during the time period of the operational situation. The operational data may include one or more pitch angles of one or more blades, a rotor speed of a generator or a wind turbine rotor, and an electrical power output from the generator. Further operational data may include internal signals that are calculated for supervision or signals that lead to a control decision. The operational data from which the operational metadata is derived may also vary over time, and vary according to different operational situations.

Apart from statistical metadata, other metadata may also be used which may be derived e.g. from AI based classification techniques. Diagnostic metadata relating to a malfunction of one or more systems controlled by the wind turbine controller may also be used in examples.

In some examples, the operational situation may be a grid event.

In some examples, as will be explained herein, the operational metadata may be used for the determination of (accumulated) fatigue loads. In further examples, the operational metadata may be used for remote diagnostics, or trouble shooting.

The module for determining accumulated fatigue loads 500 may be configured to determine whether the operational metadata of an operational situation substantially corresponds, at block 510, to the operational metadata of one of a plurality of previously defined operational situations. If the operational metadata corresponds to one of the stored operational situations, block 520, then the rain flow cycles for the operational situation are determined to be equal to the rain flow cycles of the corresponding stored operational situation. The rain flow cycles may be converted to damage equivalent loads as will be explained herein.

The module for determining accumulated fatigue loads 520 may further be configured to send 524 the operational metadata of the operational situation to the load estimation module 300 if the operational metadata of the operational situation does not correspond to any of the stored operational situations.

The module for determining accumulated fatigue loads 500 may also be configured to determine a remaining lifetime of the wind turbine or of one or more components of the wind turbine 560 based on the summed damage equivalent loads.

In examples, the module for determining accumulated fatigue loads 500 may be stored on a server, at a remote location from the wind turbine. Similarly, the load estimation module 300 may also be remote to the wind turbine.

The system may thus be configured to create a new operational situation, and store the operational metadata of the new operational situation. The load calculation module 300 is configured to determine fatigue loads 330 for the new operational situation. The fatigue loads for the new operational system may be represented as rain flow counts. The new operational situation including the corresponding operational metadata in database 515.

The load estimation module 300 may be a High Performance Computing load calculation cluster, e.g. in a remote data centre. The load estimation module may function as a digital or virtual "twin" of the wind turbine as will be described herein. The load estimation module 300 may simulate output of a numerical model for a given set of operational metadata. The numerical module may be the same numerical module as used for certification for the wind turbine. Since the numerical model may be the same as the one used for certification, the fidelity and accuracy may be high.

The load estimation module 300 may be configured to create a new operational situation based on the operational metadata and estimated fatigue loads. Block or module 310 may interpret the operational metadata that is received from module 500 into input settings for the numerical load estimation model 320. Module 310 may generate multiple variants which can be calculated in parallel.

At 330, a rain flow counting (RFC) algorithm may be used to determine the fatigue loads. Rainflow-counting algorithms are used in the analysis of fatigue data in order to reduce a spectrum of varying stress into an equivalent set of simple stress reversals.

The load estimation module 300 may calculate fatigue loads, in terms of RFC cycles for all relevant wind turbine components.

Now that the main components of the system 220 and the functioning of the local wind turbine module 400 have been discussed, a further aspect of the present disclosure will be explained in more detail.

Figure 4:
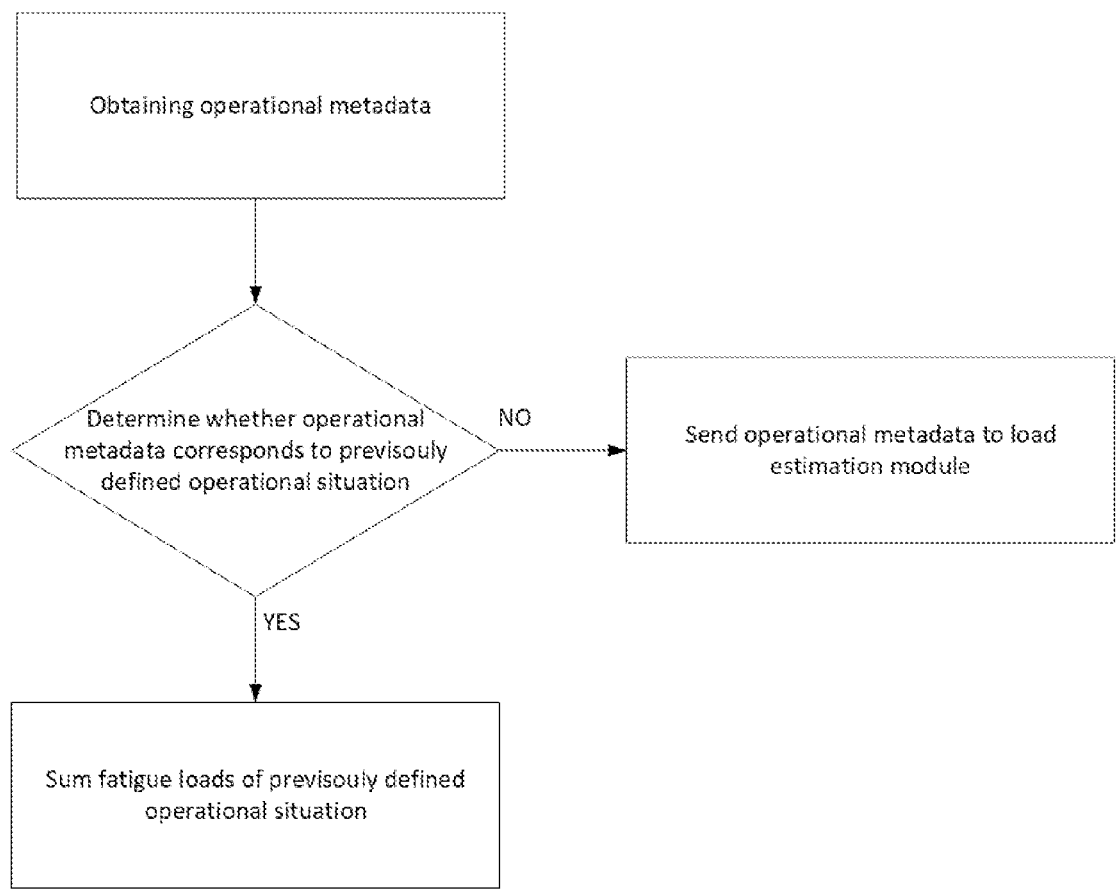
FIG. 4 schematically illustrates an example of a method for determining accumulated fatigue loads in a wind turbine.

In an aspect of the present disclosure, a method for determining accumulated fatigue loads in a wind turbine is provided. The method may be carried out, at least in part, by the module 500 for determining fatigue loads. Reference may be had to FIG. 4 illustrating an example of such a method.

The method comprises obtaining 410 operational metadata representative for an operational situation, and determining whether the operational metadata corresponds at 510, 520 to operational metadata from one of a plurality of previously defined operational situations for which fatigue loads are known, the plurality of previously defined operational situations being stored in an operational situations database 505, 515.

Previously defined operational situations stored in database, 505, 515 may include both real operational situations that have occurred during the lifetime of the wind turbine, and simulated operational situations that may have been carried out both prior to the lifetime of the wind turbine or during the lifetime of the wind turbine. Some previously defined operational situations may be based on design load cases defined in a standard such as IEC61400.

The method then further comprises summing 520 the fatigue loads of the previously defined operational situation for which the metadata corresponds to historically accumulated fatigue loads of the wind turbine to determine total accumulated fatigue loads.

Based on the total accumulated fatigue loads, the wind turbine may perform an operational change, such as e.g. downrating, uprating or pitching.

If the operational metadata of the operational situation can be matched (i.e. the operational metadata substantially corresponds) to operational metadata of a previously defined operational situation, then the fatigue loads may be assumed to be the same as the fatigue loads of the known situation. Matching may be understood as the operational metadata of the current operational situation not deviating significantly from the operational metadata of a previously defined operational situation such that the corresponding fatigue loads still sufficiently correspond to the loads of the known situation. Not deviating significantly may be defined in a variety of ways. One example is that all or a selection of the variables making up the operational metadata deviates less than corresponding predefined thresholds from the metadata stored from the previously defined operational situation. Another example is that deviations of the metadata with respect to a known situation are weighted. Other, more complicated algorithms involving artificial neural networks or other machine learning techniques like e.g. ensemble learning may be used to determine when the correspondence of metadata is sufficient, i.e. when the operational metadata corresponds sufficiently to a known situation. In further examples, different matching algorithms may be used for different operational ranges and situations. Matching algorithms may be different for e.g. high wind speeds, low wind speeds, high turbulence, grid events etc.

In some examples, the operational situation may be a grid event. To illustrate the aforementioned principles: if the operational signals of the PLC's are the same as a stored previously defined operational situation, the fatigue loads are determined to be the same as the known loads for the known operational situation. If a grid event occurs, e.g. a low voltage event or a power setpoint reduction, the wind turbine will react with certain control settings of rotor speed, electrical power output, and pitch angles. If in the database, an operational can be found with similar rotor speed, electrical power output, pitch angles (even if this relates to a different operational situation) and other external conditions, the fatigue loads are assumed to be the same as for the known situation.

In some examples, the method may further comprise sending 524 the operational metadata of the operational situation to a load estimation module 300 in case the operational metadata during the operational situation does not correspond to operational metadata from any of the plurality of previously defined operational situations.

In some examples, the new operational situation (both the operational metadata and the fatigue loads) may be stored in the operational situations database 505, 515. By defining new operational situations, their corresponding operational metadata and corresponding fatigue loads, the database of known operational situations can be enriched the database continuously. The new operational situations thus becomes a known or previously defined operational situations and they may be matched to future operational situations.

As indicated before, the method in examples may further comprise determining damage equivalent loads 540 for operational situations based on rain flow counting cycles 505 for known operational situations. Rainflow counts may be converted to damage equivalent loads (DEL) at block 540 through a Markov matrix and accumulation.

As operational situations occur during the operation and life time of the wind turbine, the fatigue loads corresponding to these operational situations may be registered and fatigue loads that the wind turbine has suffered throughout its lifetime may be determined and updated with every received metadata package.

In some examples, the method may further comprise estimating a remaining lifetime for one or more components of the wind turbine based on the total accumulated fatigue loads 540. For one or more of the components of the wind turbine, thresholds or limits in terms of fatigue loads may be defined in a database 550. By comparing the suffered loads 540 to the limits 550, a remaining operational lifetime 565 may be estimated for the wind turbine, or a selection of its components.

Based on all recorded situations, a situations report (e.g. a list) may be generated at 575.

Examples of the present disclosure may provide one or more of the following advantages: damage corresponding to transient grid events may be quantified. Such a quantification may be used in a decision to develop countermeasures and may be helpful in determining causes for damages to wind turbine components.

Insights can be provided about the conditions actually encountered by a wind turbine during its lifetime, which may help in defining future guidelines and requirements.

The usage of the wind turbine may be optimized. By taking grid events into account, the remaining lifetime may more accurately be determined. Operational changes to maximize power output may be made if it is determined that the remaining lifetime is higher than expected. Preventive maintenance may be planned if necessary.

Also, based on the grid situations or other new situation (curtailment because of noise or temperature wind misalignment uncommon turbulence etc.) and their loads, new design load cases may be generated which might be incorporated in a standard.

Examples of the methods disclosed herein may be implemented with hardware, software, firmware and combinations thereof. Examples of the methods disclosed herein may employ one or more of virtual machines, cloud computing and edge computing.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and circuits described in connection with the disclosure herein may be implemented or performed with one or more general-purpose processors, a digital signal processor (DSP), cloud computing architecture, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The present disclosure also related to computing systems adapted to carry out any of the methods disclosed herein.

The present disclosure also relates to a computer program or computer program product comprising instructions (code), which when executed, performs any of the methods disclosed herein.

The computer program may be in the form of source code, object code, a code intermediate source and object code such as in partially compiled form, or in any other form suitable for use in the implementation of the processes. The carrier may be any entity or device capable of carrying the computer program.

If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for determining accumulated fatigue loads in a wind turbine, the method comprising:
   during an operational situation, determining operational data including signals or setpoints of one or more wind turbine components under the control of a wind turbine controller;
   determining a change in the operational data indicating an end of the operational situation; and
   deriving operational metadata for the operational situation from the operational data determined during the operational situation, wherein deriving the operational metadata comprises:
      determining whether the operational metadata for the operational situation corresponds to operational metadata from one of a plurality of previously defined operational situations for which fatigue loads are known, the plurality of previously defined operational situations stored in an operational situations database;
      matching the operational situation to a known operational situation from the operational situations database that comprises the plurality of previously defined operational situations defined by the operational metadata and the corresponding fatigue loads, wherein matching comprises comparing the operational metadata for the operational situation with the operational metadata of the plurality of previously defined operational situations; and when the operational metadata for the operational situation substantially corresponds to the operational metadata of one of the plurality of the previously defined operational situations, then:

summing historically accumulated fatigue loads corresponding to the previously defined operational situation to determine total accumulated fatigue loads in the wind turbine; and performing an operational change in the wind turbine based on the total accumulated fatigue loads;

wherein the operational metadata is used for remote diagnostics or trouble shooting.

2. The method according to claim 1, further comprising sending the operational metadata for an operational situation to a load estimation module when the operational metadata for an operational situation does not correspond to the operational metadata of any of the plurality of previously defined operational situations.

3. The method according to claim 2, wherein the load estimation module creates a new operational situation based on the operational metadata for an operational situation and estimated fatigue loads.

4. The method according to claim 3, wherein the new operational situation is stored in the operational situations database.

5. The method according to claim 1, further comprising determining damage equivalent loads for the operational situation based on rain flow counting cycles for known operational situations.

6. The method according to claim 1, further comprising estimating a remaining lifetime for one or more components of the wind turbine based on the total accumulated fatigue loads.

7. The method according to claim 1, wherein the operational situation is a grid event.

8. The method according to claim 1, wherein the operational metadata includes one or more of average values, mean values, and standard deviations of operational data during a time period of the operational situation.

9. The method of claim 1, wherein the operational change comprises uprating or downrating of the wind turbine.

10. The method according to claim 1, wherein the operational metadata includes one or more of average values, mean values, and standard deviations of the operational data during a time period of the operational situation.

11. The method according to claim 1, further comprising sending the operational metadata to a module for determining fatigue loads.

* * * * *